(12) United States Patent
Dekel et al.

(10) Patent No.: US 7,831,104 B2
(45) Date of Patent: Nov. 9, 2010

(54) USING GEOMETRIC WAVELETS BASED ON ACTIVE CONTOURS FOR SIGNAL PROCESSING

(75) Inventors: Shai Dekel, Ramat-Hasharon (IL); Alexander Sherman, Modiin (IL)

(73) Assignee: General Electric Company, Schenectady, NY (US)

( * ) Notice: Subject to any disclaimer, the term of this patent is extended or adjusted under 35 U.S.C. 154(b) by 865 days.

(21) Appl. No.: 11/741,388

(22) Filed: Apr. 27, 2007

(65) Prior Publication Data

US 2008/0267518 A1 Oct. 30, 2008

(51) Int. Cl.
*G06K 9/36* (2006.01)
*G06K 9/46* (2006.01)
(52) U.S. Cl. ..................................... 382/240
(58) Field of Classification Search ................. 382/113, 382/154, 164, 173, 174, 190, 191, 197, 199, 382/203, 228, 232, 240, 266, 277, 298; 345/419, 345/440–443, 619; 375/240.26, E7.076
See application file for complete search history.

(56) References Cited

U.S. PATENT DOCUMENTS

| | | | |
|---|---|---|---|
| 5,671,294 A * | 9/1997 | Rogers et al. ............. | 382/228 |
| 5,862,245 A | 1/1999 | Renouard et al. | |
| 5,987,173 A * | 11/1999 | Kohno et al. ............. | 382/199 |
| 5,995,668 A * | 11/1999 | Corset et al. ............. | 382/233 |
| 6,573,890 B1 * | 6/2003 | Lengyel .................... | 345/419 |
| 7,177,488 B2 * | 2/2007 | Berkner et al. ............ | 382/298 |
| 7,418,144 B2 * | 8/2008 | Wang et al. ............... | 382/240 |
| 2005/0063596 A1 * | 3/2005 | Yomdin et al. ............ | 382/232 |
| 2008/0130759 A1 * | 6/2008 | Weitbruch et al. ........ | 375/240.26 |
| 2008/0267518 A1 * | 10/2008 | Dekel et al. ............... | 382/240 |

OTHER PUBLICATIONS

Image Coding With Geometric Wavelets, D. Alani, A. Averbuch, S. Dekel, IEEE Transactions on Image Processing (to appear) pp. 1-22.
Platelets: A Multiscale Approach for Recovering Edges and Surfaces in Photon-Limited Medical Imaging, R. Willett, R. Nowak, IEEE Transactions on Medical Imaging, 22 (2003), pp. 1-19.

(Continued)

*Primary Examiner*—Amir Alavi
(74) *Attorney, Agent, or Firm*—McAndrews, Held & Malloy, Ltd.; Michael A. Dellapenna

(57) ABSTRACT

Certain embodiments provide systems and methods for using geometric wavelets based on active contours for signal processing. Certain embodiments may allow image processing. A system includes providing an image processing circuitry that computes a segmentation tree using active contours for an input image data; creates a geometric wavelets representation using the segmentation tree; and then generate an image based on geometric wavelet sparse representation extracted from the geometric wavelets representation. The geometric wavelet sparse representation may comprise M most active geometric wavelets from a set of N geometric wavelets in the geometric wavelets representation. The image processing circuitry may recursively find sub-domains and multivariate polynomials for each domain at each stage in the computing of the segmentation tree. Each of the sub-domains is a domain for a succeeding stage for the segmentation tree. The recursively finding may be terminated, for example, when each domain at a stage comprises less than a determined number of pixels.

21 Claims, 5 Drawing Sheets

OTHER PUBLICATIONS

Fast Multiresolution Photon-Limited Image Reconstruction, R. Willett, R. Nowak, IEEE International Symposium on Biomedical Imaging, 2004, pp. 1-8.

Adaptive Multivariate Approximation Using Binary Space Partitions and Geometric Wavelets, S. Dekel, D. Leviatan, SIAM Journal of Numerical Analysis, 43 (2005, pp. 1-38.

Active Contours Without Edges, T. Chan, L. Vese, IEEE Transactions on Image Processing, vol. 10, No. 2, Feb. 2001, pp. 266-277.

Efficient Moment Computation Over Polygonal Domains with an Application to Rapid Wedgelet Approximation, F. Freidrich, L. Demaret, H. Fuhr, K. Wicker, preprint, pp. 1-19.

Nonlinear Piecewise Polynomial Approximation Beyond Besov Spaces, B. Karaivanov, P. Petrushev, Appl. Comput. Harmon. Anal. 15 (2003), No. 3, 177-223.

Boundary Detection by Minimizing Functionals, I., D. Mumford, J. Shah, in Proc. IEEE Conf. Computer Vision and Pattern Recognition, San Francisco, CA 1985, pp. 22-26.

Optimal Approximations of Piecewise Smooth Functions and Associated Variational Problems, D. Mumford, J. Shah, Communications in Pure and Applied Math. 42 (1989), pp. 577-685.

* cited by examiner

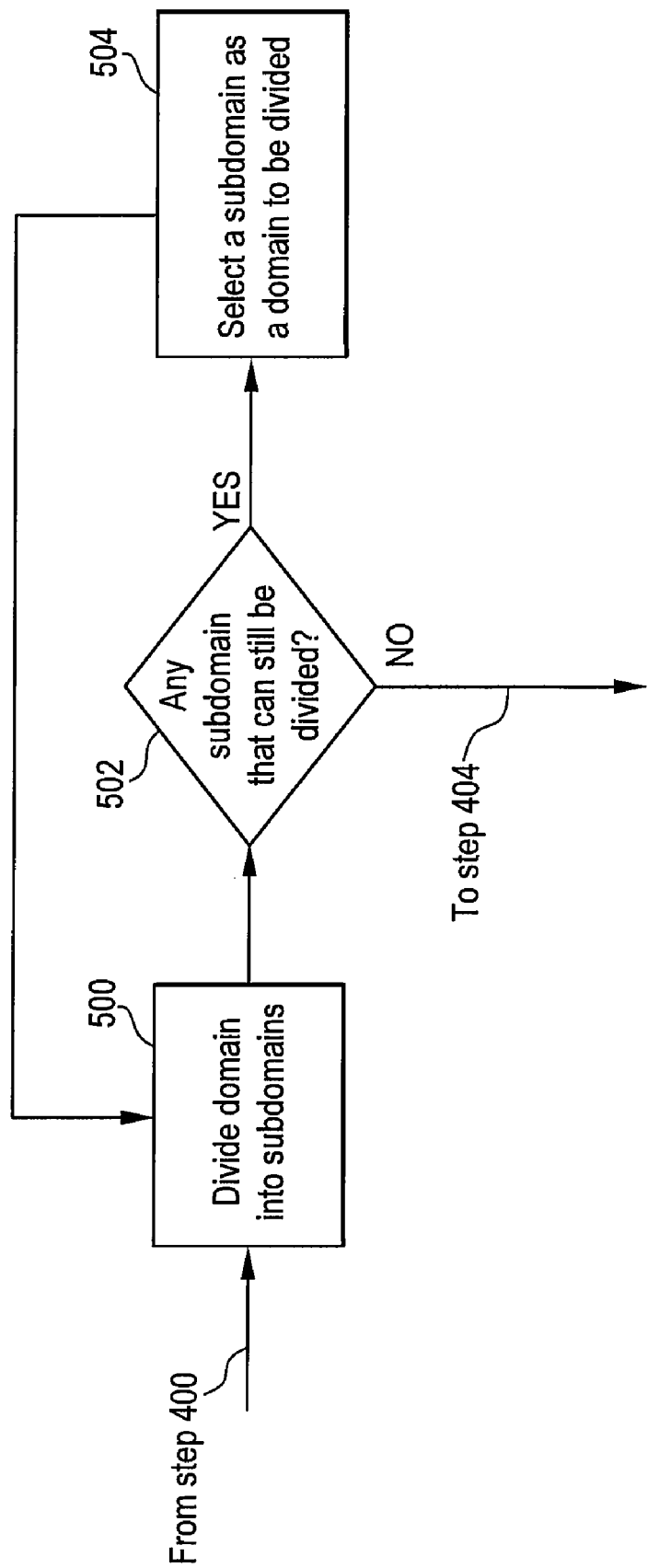

USING GEOMETRIC WAVELETS BASED ON ACTIVE CONTOURS FOR SIGNAL PROCESSING

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to imaging technology. More particularly, the present invention relates to computing geometric wavelets representation based on active contours.

Imaging systems have been developed for a variety of purposes. Some of these are for computer graphics, for video encoding for transferring video files, and for generating computer-enhanced pictures/videos. For example, an imaging system may rely upon an edge detection method for video data compression. Edge detection may also allow generating pictures and/or videos that will allow shape analysis. For example, there are a number of numerical algorithms for computing a near-minimizer of one of the methods of edge detection, Mumford-Shah functional. However, they do not produce an actual segmentation of the image into distinct regions with disjoint interiors. Instead, they classify pixels with an "edge" score, where the score implies the probability that the pixel is an edge pixel. This method may make difficult extraction of true segmentation from this "fuzzy" classification. For example, some computer aided diagnostic procedures for the medical field require that an actual segmentation curve be computed so that shape analysis can be applied to the segmented object for the purpose of detecting abnormalities.

In the medical field, an imaging system that can provide as much detail as possible from a limited video data may be valuable to a radiologist in his work since the radiologist relies on X-ray pictures, MRI or CAT scans, and other visual rendition of a patient's body in assessing a patient's health. However, in some situations, there may not be enough data available for generation of an acceptable video/picture output. For example, in photon-limited images, the random nature of photon emission and detection is the dominant source of noise in the imaging system. In these cases, the relatively small number of detected photons is a factor limiting the signal-to-noise ratio. These applications comprise Positron Emission Tomography (PET), Single Photon Emission Computed Tomography (SPECT), Confocal Microscopy, and Infrared (IR) imaging.

The data collected by these imaging systems are usually assumed to obey a spatial Poisson distribution involving a two-dimensional intensity image that descries the probability of photon emissions at different locations in space. The mean and variance of a Poisson process are equal to the intensity, where the intensity mean corresponds to the "signal" of interest and the variability of the data about the mean can be interpreted as "noise." In some sense, it may be said that the noise in photon-limited imaging is signal dependent. Thus, a reconstruction method that removes the Poisson noise while preserving the main feature of the image will be useful.

BRIEF SUMMARY OF THE INVENTION

Certain embodiments of the invention provide systems and methods for image processing.

Certain embodiments of the invention provide a method for image processing. The method includes computing a segmentation tree for an input image data using active contours; creating a geometric wavelets representation using a segmentation tree; and generating an image based on geometric wavelet sparse representation extracted from the geometric wavelets representation. The method also includes recursively finding sub-domains and low-order multivariate polynomials for at least one domain at each stage in the computing of the segmentation tree, where each sub-domain may be a domain for a succeeding stage in creating the segmentation tree, if the recursive finding is not terminated. The succeeding stage may be the next stage or another stage down the line.

The low-order multivariate (2D for a single image, 3D for an image sequence, etc) polynomials may be found, for example, using least-squares method. The process of recursively finding sub-domains may be terminated, for example, when each domain at a stage comprises less than a determined number of pixels. The geometric wavelet sparse representation may comprise, for example, M most active geometric wavelets from a set of N geometric wavelets in the geometric wavelets representation, where M is a number less than N. The segmentation tree may be generated, for example, using binary space partition.

Certain embodiments provide a system for providing geometric wavelets based on active contours. The system may include providing an image processing circuitry that computes a segmentation tree using active contours for an input image data. The image processing circuitry may create a geometric wavelets representation using a segmentation tree. The image processing circuitry may generate an image based on geometric wavelet sparse representation that may be extracted from the geometric wavelets representation. The image processing circuitry may recursively find sub-domains and low-order multivariate polynomials for at least one domain at each stage in the computing of the segmentation tree, if the recursive finding is not terminated. The system may use, for example, a least-squares method to find the low-order multivariate polynomials.

Each of the sub-domains is a domain for a succeeding stage for the segmentation tree. The recursively finding may be terminated, for example, when each domain at a stage comprises less than a determined number of pixels. The image processing circuitry may generate the geometric wavelet sparse representation comprising M most active geometric wavelets from a set of N geometric wavelets in the geometric wavelets representation, where M is a number less than N. The system may generate, for example, the segmentation tree using binary space partition.

BRIEF DESCRIPTION OF SEVERAL VIEWS OF THE DRAWINGS

FIG. 5 illustrates an exemplary flow diagram for generating a segmentation tree using active contours in accordance with an embodiment of the present invention.

Figure 1:
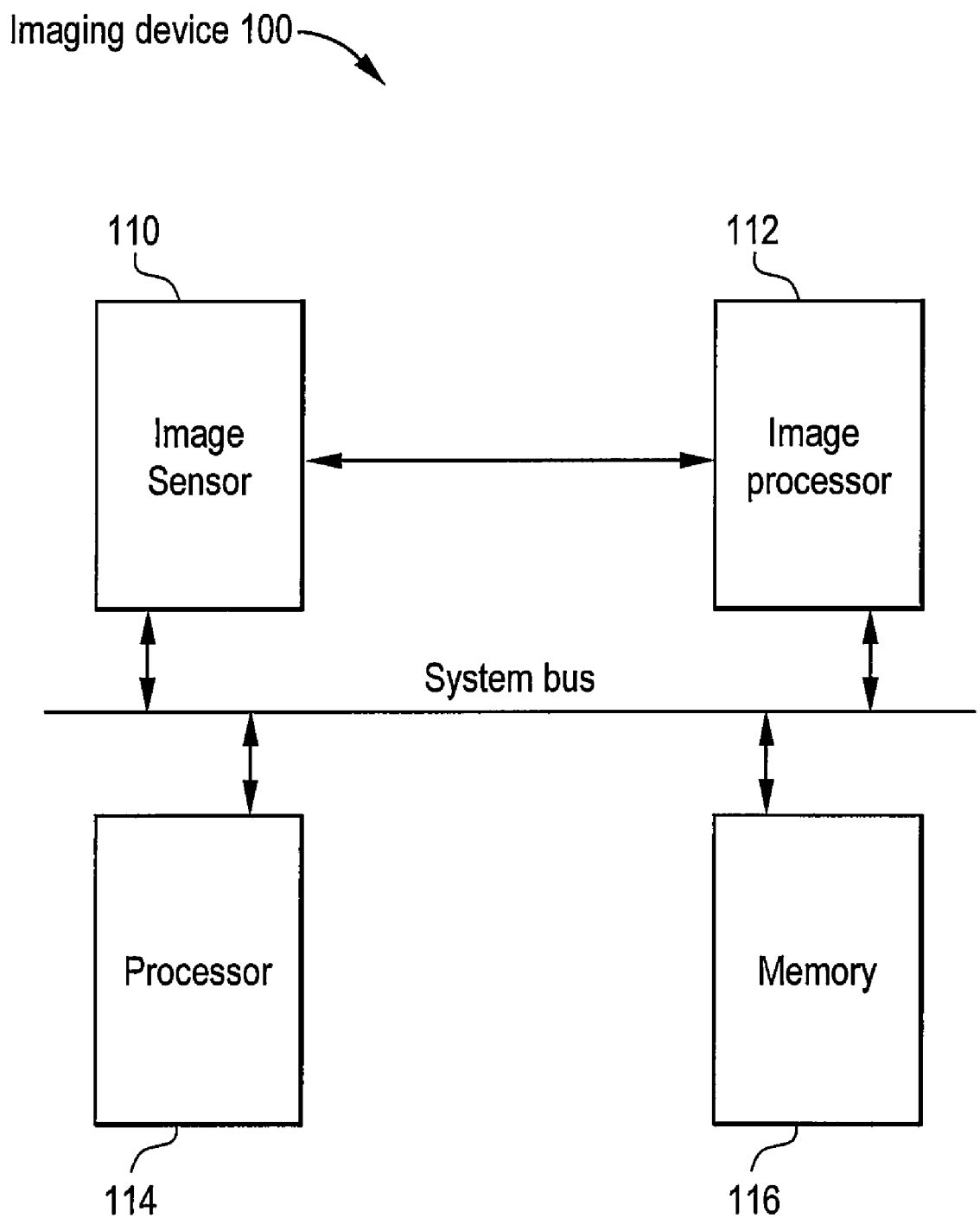
FIG. 1 is an exemplary diagram of a portion of an imaging device, which may be utilized with an embodiment of the invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 is an exemplary diagram of a portion of an imaging device, which may be utilized with an embodiment of the invention. Referring to FIG. 1, there is shown an imaging device 100. The imaging device 100 may comprise an image sensor 110, an image processor 112, a processor 114, and a memory block 116. The image sensor 110 may comprise suitable circuitry and/or logic that may enable capture of images, which may include, for example, video images and still images. The images captured may be further processed as video and/or still photograph outputs.

The image processor 112 may comprise suitable circuitry, logic, and/or code that may enable processing of image data. The processor 114 may comprise suitable circuitry, logic, and/or code that may enable general processing. For example, the processor 114 may determine the mode of operation of various portions of the imaging device 100. For example, the processor 114 may set up data registers in the image processor 112 to allow direct memory access (DMA) transfers of video data to the memory block 116. The processor may also communicate instructions to the image sensor 110 to initiate capturing of images. The memory block 116 may be used to store image data that may be processed and communicated by the image processor 112. The memory block 116 may also be used for storing code and/or data that may be used by the processor 114. The memory block 116 may also be used to store data for other functionalities of the imaging device 100. For example, the memory block 114 may store data corresponding to voice communication.

In operation, the processor 114 may initiate image capture by the image sensor 110. The image sensor 110 may communicate, for example, the YUV data corresponding to the captured images to the image processor 112. The processor 114 may provide information to the image processor 112 for DMA transfer of processed image data to the memory block 116. The image data in the memory block 116 may be further processed, for example, by the processor 114. The processing by the processor 114 may comprise, for example, preparing the image for printing and/or transmission to another network node.

While an embodiment of the invention may have been described as comprising the image processor 112 and the processor 114, the invention need not be so limited. For example, the processor 114 may comprise the functionality of the image processor 112.

Figure 2:
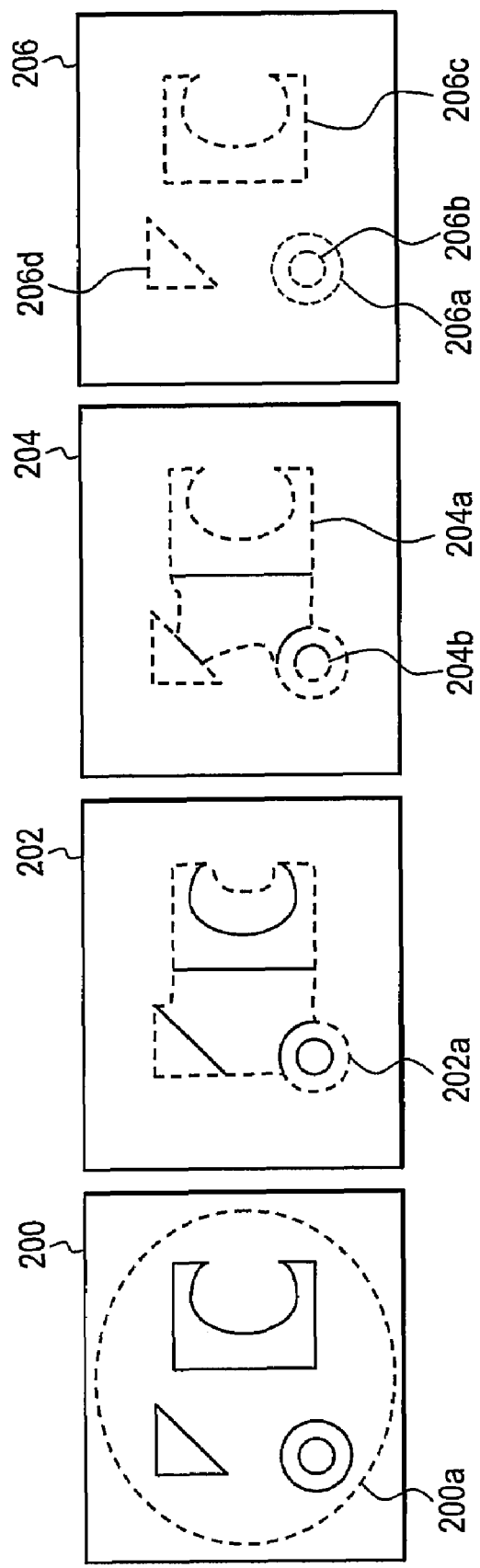
FIG. 2 shows exemplary diagrams of an image being detected using active contours method, which may be utilized with an embodiment of the invention.

FIG. 2 shows exemplary diagrams of an image being detected using active contours method, which may be utilized with an embodiment of the invention. Referring to FIG. 2, there is shown frames 200, 202, 204, and 206, where an initial outline 200a in the frame 200 may converge to a final outline in the frame 206. Same images may be in the frames 200, 202, 204, and 206, and the images may be photon-limited images. Outline 200a shown in the frame 200 may be a circle. The image processor 112 may, for example, draw a circle as a default outline 200a, where the default outline 200a may be selected to generally encircle images in the frame 200. In the frame 202, the image processor 112 may converge to a more accurate outline 202a from the outline 200a.

Similarly, in the frame 204, the image processor 112 may converge to a still more accurate outline 204a, and start to generate an interior circle outline 204b. In the frame 206, the image processor 112 may generate distinct outlines 206a and 206b for the toroid image on the lower left-hand side of the frame 206, the outline 206c for the image on the right hand side of the frame 206, and the outline 206d for the triangle image on the top left-hand side of the frame 206. The image processor 112 may, for example, use the active contours method to converge to more accurate outlines.

For example, given a multivariate real-valued function (image) $f$ defined on a domain such as the d-th dimensional unit cube $[0,1]^d$, one may subdivide the initial domain into two sub-domains. In Binary Space Partition (BSP) applications, the subdivision may be performed by intersecting the domain with a hyper-plane, which may be a line for the case where d=2. The partition is performed so that a given cost function is minimized. This subdivision then proceeds recursively on the sub-domains until some exit criterion is met. At each stage of the BSP process, for a given convex polytope $\Omega$, the algorithm finds two sub-domains $\Omega'$, $\Omega''$ and two low-order polynomials $Q_{\Omega'}$, $Q_{\Omega''}$, that minimize the quantity $$\|f - Q_{\Omega'}\|_{L_2(\Omega')}^2 + \|f - Q_{\Omega''}\|_{L_2(\Omega'')}^2 \qquad (1.1)$$

over all pairs $\Omega'$, $\Omega''$ of polyhedral domains that are the result of an binary space partition of $\Omega$ by a hyper-plane, where $$\|g\|_{L_2(\Omega)} := \left(\sum_{x \in \Omega} g(x)^2\right)^{1/2}. \qquad (1.2)$$

The quantity in (1.2) is the $L_2$ norm of a discrete function over a domain $\Omega$. In some embodiments, other 'energy' quantifications may be applied.

To minimize (1.1), candidate partitions of the domain $\Omega$ may need to be tested. Once a test partition is fixed, the polynomials $Q_{\Omega'}$, $Q_{\Omega''}$ can be calculated separately using, for example, the least-squares technique. For example, in an embodiment where d=2, the polynomials are linear and $\Omega'$ is one of the sub-domains, one minimizes $$\min_{a,b,c} \sum_{(x_1, x_2) \in \Omega'} (f(x_1, x_2) - (ax_1 + bx_2 + c))^2.$$

The above least square minimization is performed by solving the linear system of three equations:

$$\begin{cases} \left(\sum_{(x_1,x_2) \in \Omega'} x_1^2\right)a + \left(\sum_{(x_1,x_2) \in \Omega'} x_1 x_2\right)b + \left(\sum_{(x_1,x_2) \in \Omega'} x_1\right)c = \sum_{(x_1,x_2) \in \Omega'} f(x_1, x_2) x_1 \\ \left(\sum_{(x_1,x_2) \in \Omega'} x_1 x_2\right)a + \left(\sum_{(x_1,x_2) \in \Omega'} x_2^2\right)b + \left(\sum_{(x_1,x_2) \in \Omega'} x_2\right)c = \sum_{(x_1,x_2) \in \Omega'} f(x_1, x_2) x_2 \\ \left(\sum_{(x_1,x_2) \in \Omega'} x_1\right)a + \left(\sum_{(x_1,x_2) \in \Omega'} x_2\right)b + \left(\sum_{(x_1,x_2) \in \Omega'} 1\right)c = \sum_{(x_1,x_2) \in \Omega'} f(x_1, x_2) \end{cases} \qquad (1.3)$$

We then set $$Q_{\Omega'}(x_1,x_2)=ax_1+bx_2=c. \quad (1.4)$$

The same calculations can be performed over $\Omega''$, and once the polynomials $Q_{\Omega'}$, $Q_{\Omega''}$ are computed, one can also compute (1.1) for the tested partition and compare with previously tested partitions. To speed up calculations of the type (1.3), one can pre-compute moment integrals, as a pre-processing step, at all the points of the original domain. Once a domain $\Omega$ is partitioned into two 'optimal' sub-domains $\Omega'$, $\Omega''$, the process may be applied recursively on the sub-domains. The subdivision process may be terminated, for example, when each sub-domain contains only a few pixels.

An embodiment of the invention may replace the hyperplane with a curved partition. The curved partition may be computed, for example, using the active contour paradigm. In one embodiment of the invention, (1.1) may be replaced by $$\text{len}(\gamma)+\mu(\|f-Q_{\Omega'}\|_{L_2(\Omega')}^2+\|f-Q_{\Omega''}\|_{L_2(\Omega'')}^2), \quad (1.5)$$

where $\gamma$ is the segmentation curve between the sub-regions $\Omega'$, $\Omega''$ and $\mu>0$ is a weight parameter. Regions and sub-regions may also be referred to as, for example, domains and sub-domains.

Accordingly, the active contour algorithm may find a solution to (1.5) for the frame 200, where a square domain may be partitioned into four sub-regions in the presence of Poisson 'noise'. The sub-regions $\Omega'$ and $\Omega''$ need not be connected regions. For example, the toroid image on the lower left-hand side of the frame 206 outlined by the outlines 206a and 206b, the triangle image outlined by the outline 206d, and the image on the right hand side of the frame 206 outlined by the outline 206c are not connected regions. In such a case, sub-regions $\Omega'$ and $\Omega''$ may be further subdivided into their connected components and thus a region $\Omega$ may have more than two children in a tree. As in the standard BSP method, the algorithm may proceed recursively on the connected sub-regions to create a segmentation tree.

Figure 3A:
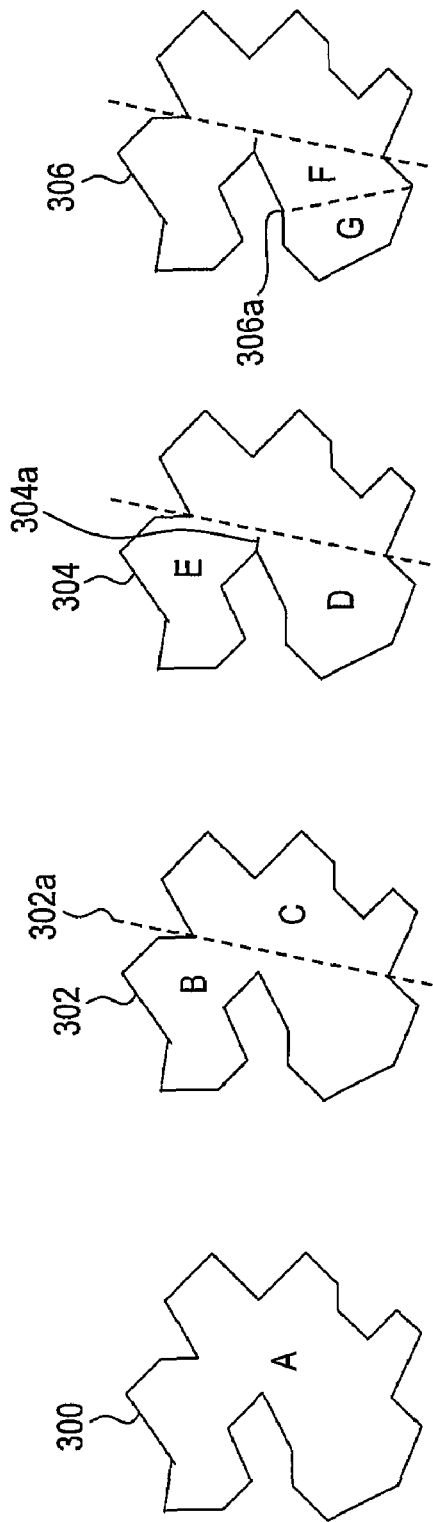
FIG. 3A shows an exemplary segmentation of an image, which may be utilized with an embodiment of the invention.

FIG. 3A shows an exemplary segmentation of an image, in accordance with an embodiment of the invention. Referring to FIG. 3A, there is shown a connected region A that may be divided to create a segmentation tree. The initial region A may be seen in the frame 300. The initial region A may be divided into sub-regions B and C by the curved partition 302a in the frame 302. The frame 304 shows the sub-region B divided into sub-regions D and E by the curved partition 304a. The frame 306 shows the sub-region D divided into sub-regions F and G by the curved partition 306a. The curved partitions 302a, 304a, and 306a may be generated using, for example, the active contour algorithm. The partitions 302a, 304a, and 306a may be shown as straight lines for ease of presentation.

Figure 3B:
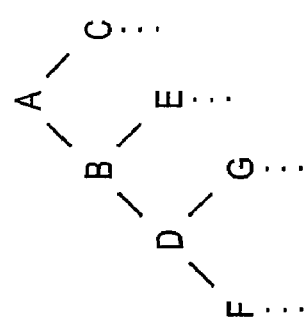
FIG. 3B shows generation of an exemplary segmentation tree corresponding to FIG. 3A, which may be utilized with an embodiment of the invention.

Accordingly, a segmentation tree may be generated, where each branch of the segmentation tree may indicate a sub-region of the initial region A. A partial segmentation tree that corresponds to the segmentation shown in the frames 300, 302, 304, and 306 is shown in FIG. 3B.

Figure 4:
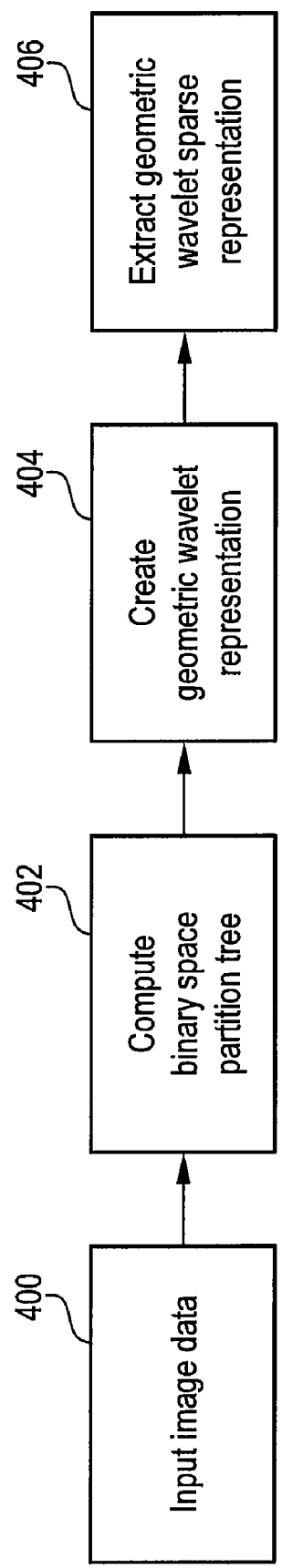
FIG. 4 illustrates an exemplary flow diagram for finding geometric wavelets based on active contours in accordance with an embodiment of the present invention.

FIG. 4 illustrates an exemplary flow diagram for a geometric wavelets algorithm based on active contours in accordance with an embodiment of the present invention. Referring to FIG. 4, there is shown steps 400 to 406. In step 400, data corresponding to an image frame may be received for image processing. The image frame may comprise, for example, one or more unconnected images. In step 402, a binary space partition segment tree may be computed as illustrated, for example, with respect to FIGS. 2, 3A, and 3B.

In step 404, once the segmentation tree is constructed, a geometric wavelets representation that is supported on this tree may be computed. For example, $\Omega'$ may be a child of $\Omega$ in a segmentation tree, that is, $\Omega' \subset \Omega$ and $\Omega'$ was created by the curved partition of $\Omega$. The polynomial approximations $Q_\Omega$, $Q_{\Omega'}$ that were found for these domains by a local minimization such as (1.5) may be used, and a geometric wavelet may be defined as:

$$\psi_{\Omega'}:=\psi_{\Omega'}(f):=1_{\Omega'}(Q_{\Omega'}-Q_\Omega). \quad (1.6)$$

Accordingly, the geometric wavelet may be associated with the sub-region $\Omega'$ and the function $f$. A reader familiar in the art of Wavelet Theory will notice that $\psi_{\Omega'}$ is a 'local difference' component that belongs to the detail space between two levels in the BSP tree, a 'low resolution' level associated with $\Omega$ and a 'high resolution' level associated with $\Omega'$. Also, these wavelets also have the 'zero moments' property. That is, if $f$ is locally a polynomial over $\Omega$, then $Q_{\Omega'}=Q_\Omega=f$ and $\psi_{\Omega'}=0$.

Under certain mild conditions on the partition $\mathcal{P}$, the function $f$ may be defined as:

$$f = \sum_{\Omega \in \mathcal{P}} \psi_\Omega(f), \quad (1.7)$$

where $$\psi_{[0,1]^d} := \psi_{[0,1]^d}(f) := Q_{[0,1]^d}. \quad (1.8)$$

The geometric wavelets (1.6) may be computed, and they may be sorted according to their $L_2$ norm:

$$\|\psi\Omega_{k_1}\|_2 \geq \|\psi\Omega_{k_2}\|_2 \geq \|\psi\Omega_{k_3}\|_2 \quad (1.9)$$

As noted earlier, in some embodiments, other 'energy' quantifications may be used as a criterion to sort the geometric wavelet contribution/importance.

In step 406, given an integer $n \in \square$, a sparse representation or approximation of the input function by the n-term geometric wavelet sum may be extracted:

$$\sum_{j=1}^{n} \psi_{\Omega_{k_j}}. \quad (1.10)$$

The sum (1.10) may be, in some sense, a generalization of the classical n-term wavelet approximation where the wavelets are constructed over dyadic cubes. As with classical wavelets, the n-term strategy may be used for progressive approximation and rate-distortion control, where more geometric wavelets may be added according to their order in (1.9).

FIG. 5 illustrates an exemplary flow diagram for generating a segmentation tree using active contours in accordance with an embodiment of the present invention. Referring to FIG. 5, there is shown steps 500 to 504 that may be an expansion of the step 402. In step 500, a region may be divided into sub-regions, such as, for example, in the frames 302, 304, and 306. The sub-regions may then be considered to be regions for segmentation purposes. Accordingly, the sub-region B in frame 302 may be considered to be a region B that may be segmented to sub-regions D and E in the frame 304.

In step 502, a determination may be made as to whether any region can be segmented further. This step may be referred to as, for example, a stage. Various algorithms may be suitable for segmenting an image. For example, an algorithm used may be pre-order traversal, or level-order. The criterion or criteria for determining whether a region can be segmented may be design and/or implementation dependent. For example, a criterion may be the number of pixels in the region. If there is at least one region that can be further segmented, the next step may be step 504. In step 504, a region may be selected for segmentation. The next step may be step 500. Otherwise, there may not be any regions that can be segmented further, and the segmentation may be terminated. The next step may then be step 404.

Another embodiment of the invention may provide a machine-readable storage, having stored thereon, a computer program having at least one code section executable by a machine, thereby causing the machine to perform the steps as described above for method and system for using geometric wavelets based on active contours for signal processing.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for image processing, said method comprising: using a processor to perform the following:
   computing a segmentation tree for an input image data using active contours;
   creating a geometric wavelets representation using said segmentation tree; and
   generating an image based on geometric wavelet sparse representation extracted from said geometric wavelets representation.

2. The method of claim 1, comprising recursively finding at least two sub-domains and at least two polynomials for at least one domain at each stage in said computing of said segmentation tree, if said recursively finding is not terminated.

3. The method of claim 2, comprising using least-squares method to find said polynomials.

4. The method of claim 2, wherein each of said sub-domains is a domain for a succeeding stage for said segmentation tree.

5. The method of claim 2, wherein said recursively finding is terminated when each said domain at a stage comprises less than a determined number of pixels.

6. The method of claim 1, wherein said geometric wavelet sparse representation comprises M most active geometric wavelets from a set of N geometric wavelets in said geometric wavelets representation, where M is a number less than N.

7. The method of claim 1, comprising generating said segmentation tree using binary space partition.

8. A non-transitory machine-readable storage having stored thereon, a computer program having at least one code section for image processing, the at least one code section being executable by a machine for causing the machine to perform steps comprising:
   computing a segmentation tree for an input image data using active contours;
   creating a geometric wavelets representation using said segmentation tree; and
   generating an image based on geometric wavelet sparse representation extracted from said geometric wavelets representation.

9. The non-transitory machine-readable storage according to claim 8, wherein the at least one code section comprises recursively finding at least two sub-domains and at least two low-order polynomials for at least one domain at each stage in said computing of said segmentation tree, if said recursively finding is not terminated.

10. The non-transitory machine-readable storage according to claim 9, wherein the at least one code section comprises using least-squares method to find said low-order polynomials.

11. The non-transitory machine-readable storage according to claim 9, wherein each of said sub-domains is a domain for a succeeding stage for said segmentation tree.

12. The non-transitory machine-readable storage according to claim 9, wherein the at least one code section comprises terminating said recursively finding when each said domain at a stage comprises fewer than a determined number of pixels.

13. The non-transitory machine-readable storage according to claim 8, wherein said geometric wavelet sparse representation comprises M most active geometric wavelets from a set of N geometric wavelets in said geometric wavelets representation, where M is a number less than N.

14. The non-transitory machine-readable storage according to claim 8, wherein the at least one code section comprises generating said segmentation tree using binary space partition.

15. A system for image processing, said system comprising:
   an image processing circuitry that computes a segmentation tree using active contours for an input image data;
   said image processing circuitry creating a geometric wavelets representation using said segmentation tree; and
   said image processing circuitry generating an image based on geometric wavelet sparse representation extracted from said geometric wavelets representation.

16. The system of claim 15, wherein said image processing circuitry recursively finds at least two sub-domains and at least two low-order polynomials for at least one domain at each stage in said computing of said segmentation tree, if said recursively finding is not terminated.

17. The system of claim 16, wherein least-squares method is used to find said polynomials.

18. The system of claim 16, wherein each of said sub-domains is a domain for a succeeding stage for said segmentation tree.

19. The system of claim 16, wherein said recursively finding is terminated when each said domain at a stage comprises less than a determined number of pixels.

20. The system of claim 15, wherein said image processing circuitry generates said geometric wavelet sparse representation comprising M most active geometric wavelets from a set of N geometric wavelets in said geometric wavelets representation, where M is a number less than N.

21. The system of claim 15, terminating generating said segmentation tree using binary space partition.

* * * * *